(12) United States Patent
Chinnakkonda Vidyapoornachary et al.

(10) Patent No.: US 10,007,456 B1
(45) Date of Patent: Jun. 26, 2018

(54) EFFICIENT SCRUBBING OF MIRRORED MEMORY

(71) Applicant: International Business Machines Corporation, Armonk, NY (US)

(72) Inventors: Diyanesh B. Chinnakkonda Vidyapoornachary, Bangalore (IN); Marc A. Gollub, Pflugerville, TX (US); Preetham H. Raghavendra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/718,703

(22) Filed: Sep. 28, 2017

Related U.S. Application Data

(63) Continuation of application No. 15/432,972, filed on Feb. 15, 2017.

(51) Int. Cl.
*G06F 3/06* (2006.01)
*G06F 11/16* (2006.01)
*G06F 11/10* (2006.01)

(52) U.S. Cl.
CPC ............ *G06F 3/0619* (2013.01); *G06F 3/065* (2013.01); *G06F 3/067* (2013.01); *G06F 3/0644* (2013.01); *G06F 11/1048* (2013.01); *G06F 11/1666* (2013.01)

(58) Field of Classification Search
CPC ...... G06F 3/0619; G06F 3/0644; G06F 3/065; G06F 11/08; G06F 11/10; G06F 11/1048; G06F 11/1076; G06F 11/1666; G06F 11/167
See application file for complete search history.

(56) References Cited

U.S. PATENT DOCUMENTS

| 5,632,012 | A | 5/1997 | Belsan et al. |
| 6,766,429 | B1 | 7/2004 | Bland et al. |
| 8,898,408 | B2 | 11/2014 | Berke et al. |
| 2005/0060603 | A1 | 3/2005 | Pomaranski et al. |
| 2009/0158088 | A1 | 6/2009 | Hillman et al. |

OTHER PUBLICATIONS

"Hypervisor Memory Mirroring", Software version: 6.1.1, 7.1, Reference #: N1012233, Modified date: Dec. 3, 2013, 8 pages, <http://www-01.ibm.com/support/docview.wss?uid=nas8N1012233>.
Appendix P List of IBM Patents or Applications Treated as Related dated Sep. 28 2017. Two pages.
Original U.S. Appl. No. 15/432,972, filed Feb. 15, 2017.

*Primary Examiner* — Hal Schnee
(74) *Attorney, Agent, or Firm* — Stephen R. Yoder

(57) ABSTRACT

A method comprising of allocating a main memory partition and a mirrored memory partition, a mirrored copy of the main memory partition, of a mirrored memory system for scrubbing. The method also comprises of dividing the main memory partition into a first main portion and a second main portion and dividing the mirrored memory partition into a first mirrored portion and a second mirrored portion. The method determines a full scrub cycle that only scrubs a portion of the main memory channel and a portion of the mirrored memory partition, the full scrub cycle including scrubbing a main scrub portion, one of the first and the second main portions, and a mirrored scrub portion, one of the first and the second mirrored portions. The method initiates the full scrub cycle which includes a combination of memory portions, equivalent to a memory address range of the main memory partition.

1 Claim, 5 Drawing Sheets

EFFICIENT SCRUBBING OF MIRRORED MEMORY

BACKGROUND OF THE INVENTION

The present invention relates to computer systems, and more specifically, to mirrored memory scrubbing of computer memory errors.

Computer memory chips are susceptible to natural background radiation such as cosmic rays and alpha particles. For example, radioactive elements in a computer chip's material decay and release alpha particles into the chip. Radiation such as this occasionally causes inconsistencies within a system's memory which result in errors. Such errors are often referred to as soft errors. This natural radiation can cause a memory cell to change state to a different value, while not altering the physical structure of the computer chip. Soft errors range from a variation in an instruction within a program, to a modification in a single data value. The probability of a soft error occurring is relatively small. However, with the large amount of memory included in modern computer systems, the rate of occurrence increases significantly.

Memory scrubbing is a process used to correct errors of memory locations by inspecting and correcting errors using error-correcting code (ECC), as well as replacing the corrected data back in its original location. This process is done periodically as a background operation of a system.

A memory controller scans through a system's memory and determines where soft errors occur. ECC is generally implemented to correct detected soft memory errors, then replaces the detected errors with corrected data at the appropriate location. Memory scrubbing is often classified as a reliability, availability, and serviceability (RAS) feature as it generally increases reliability of a system's memory.

The memory scrubbing process is done periodically, in the background of a system, rather than constantly. Performing memory scrubbing generally requires additional system power to check for and correct errors, as well as requires additional logic in the memory controller to manage the reading of the memory.

A mirrored memory system consists of a division of memory into two memory channels, sometimes referred to as memory partitions. Data stored in a main memory channel is duplicated in a mirrored memory channel. If a soft error occurs in the main memory channel, the mirrored memory channel can be used to access the correct data or instruction, and ECC is applied to correct errors and reflect identical information.

For mirrored memory systems, the main memory and mirrored memory are identical, other than for unpredictable soft errors, therefore, errors found in one memory channel can be corrected using the corresponding memory location of the other memory channel. The main memory and mirrored memory are scrubbed concurrently during the memory scrubbing process.

SUMMARY

Embodiments of the present invention disclose a method for scrubbing memory. The method performs the following steps (not necessarily in the following order): allocating a main memory partition of a mirrored memory system and a mirrored memory partition of the mirrored memory system for scrubbing, the mirrored memory partition being a mirrored copy of the main memory partition; dividing the main memory partition into two portions, the two portions being a first main memory portion and a second main memory portion; dividing the mirrored memory partition into two portions, the two portions being a first mirrored memory portion and a second mirrored memory portion; establishing a full scrub cycle that only scrubs one portion of the main memory partition and one portion of the mirrored memory partition, the full scrub cycle including scrubbing a main memory scrub portion and a mirrored memory scrub portion; identifying the main memory scrub portion as the first main memory portion and the mirrored memory scrub portion as the second mirrored memory portion for the full scrub cycle, the main memory scrub portion being one half of the main memory partition and the mirrored memory scrub portion being one half of the mirrored memory partition, wherein content of the main memory scrub portion and content of the mirrored memory scrub portion are distinct and are equivalent to a memory address range of the main memory partition; initiating the full scrub cycle at a first time; responsive to reaching a predetermined time after the first time, establishing a consecutive scrub cycle that only scrubs an alternate main memory scrub portion and an alternate mirrored memory scrub portion, wherein the alternate main memory scrub portion is the second main memory portion and the alternate mirrored memory scrub portion is the first mirrored memory portion; and initiating the consecutive scrub cycle. Allocating the main memory partition and the mirrored memory partition is performed on a network connected to a remote computing device. The main memory scrub portion and the mirrored memory scrub portion include non-consecutive portions of respective memory partitions. The local computing device includes a redundant array of independent disks (RAID). The computer memory utilizes the mirrored memory system including the main memory partition and the mirrored memory partition that in combination defines the memory address range of the local computing device.

DETAILED DESCRIPTION

Embodiments of the present invention recognize that memory scrubbing operations consume processor time and operational power to check memory consistency and perform any necessary corrections. Although memory scrub operations provide benefits in terms of increasing reliability, availability, and serviceability (RAS), such operations have drawbacks, such as, (i) increased power consumption due to parsing a large amount of data, and (ii) the additional logic that is required in the memory controller to manage the read operation by inserting cycles in the scheduler queue.

Embodiments of the present invention provide a computer-implemented method for memory scrubbing that omits scrubbing of redundant portions of a memory. Instead of scrubbing the entirety of both the main memory channel and the mirrored memory, only portions of the memory that are selected are scrubbed, reducing the overall power usage. Generally, mirrored memory systems include scrubbing of both the main and mirrored memories in their entirety. If, for example, it takes 24 hours and 10 Watts (W) of power to scrub the entire address range of one channel of memory, it would take 24 hours and 20 W to scrub both channels of memory in a mirrored memory system when done concurrently.

Embodiments of the present invention propose dividing the address ranges of the duplicate memory channels of mirrored memory systems, and scrubbing alternate halves of each memory channel, effectively scrubbing an equivalent of one memory channel. Referring to the previous time and power examples for a standard scrub of a mirrored memory system, scrubbing half the address range of the main memory channel would take 12 hours and 5 W. When done concurrently with half the total memory address range of the mirrored memory channel, it would take 12 hours and 10 W. Therefore, embodiments of the present invention provide a net benefit of 50% of both the time and power consumption needed to scrub the equivalent of the total memory address range, using the duplication attribute of a standard mirrored memory system.

Further, embodiments of the present invention provide a method of scrubbing half of the entire memory address range while ensuring that an equivalence of the contents of the entire memory address range complete scrubbing for each scrubbing cycle. Embodiments of the present invention identify and correct soft errors by scrubbing one half of each of the identical memory channels and avoid scrubbing redundant memory portions.

Figure 1:
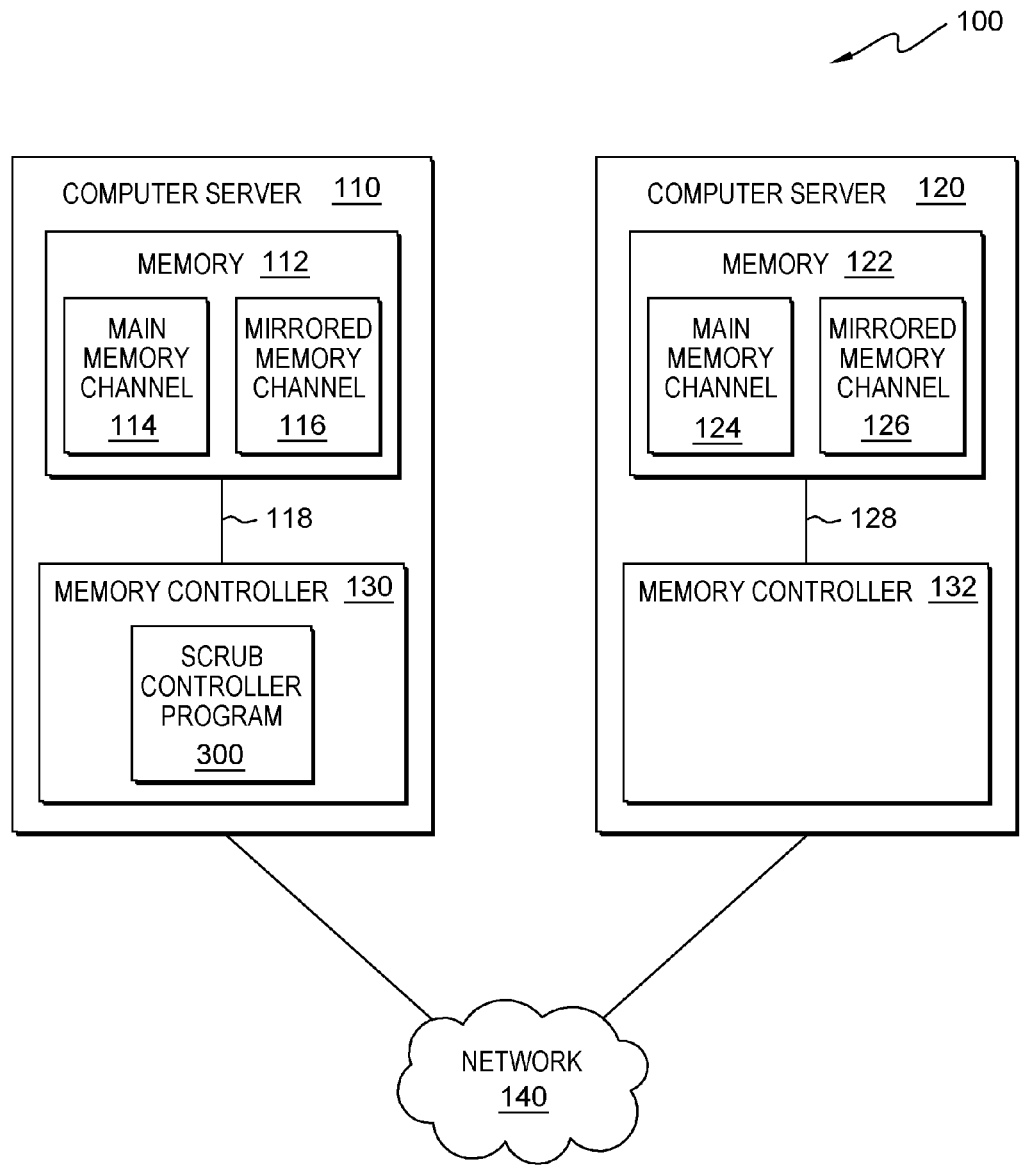
FIG. 1 is a functional block diagram illustrating a distributed data processing environment, in accordance with one embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computer server 110, which further includes memory 112 and memory controller 130; and computer server 120, which further includes memory 122 and memory controller 132; all of which are interconnected via network 140. Memory 112 contains main memory channel 114 and mirrored memory channel 116. Memory 122 contains main memory channel 124 and mirrored memory channel 126. Memory controller 130 of server 110 is depicted as including scrub controller program 300.

Network 140 can be, for example, a telecommunications network, a local area network (LAN), a wide area network (WAN), such as the Internet, or a combination of the three, and can include wired, wireless, or fiber optic connections. Network 140 can include one or more wired and/or wireless networks that are capable of receiving and transmitting data, voice, and/or video signals, including multimedia signals that include voice, data, and video information. In general, network 140 can be any combination of connections and protocols that will support communications between computer server 110, computer server 120, and other computing devices (not shown) within distributed data processing environment 100.

In some embodiments of the present invention, computer server 110 and computer server 120 can either or both be a standalone computing device, a management server, a web server, a mobile computing device, or any other electronic device or computing system capable of receiving, sending, and processing data. In other embodiments, either or both computer server 110 and computer server 120 can represent a server computing system utilizing multiple computers as a server system, such as in a cloud computing environment. In another embodiment, computer server 110 and computer server 120 can either or both be a laptop computer, a tablet computer, a netbook computer, a personal computer (PC), a desktop computer, a personal digital assistant (PDA), a smart phone, or any other programmable electronic device capable of communicating with each other and other computing devices (not shown) within distributed data processing environment 100 via network 140. In another embodiment, either or both computer server 110 and computer server 120 represents a computing system utilizing clustered computers and components (e.g., database server computers, application server computers, etc.) that act as a single pool of seamless resources when accessed within distributed data processing environment 100. Computer server 110 includes memory 112 and memory controller 130, which are interconnected by communication bus 118. Computer server 120 includes memory 122 and memory controller 132, which are interconnected by communication bus 128. Computer server 110 and computer server 120 may include internal and external hardware components, as depicted and described in further detail with respect to FIG. 5.

Memory 112 and memory 122 may comprise a random-access semiconductor memory, storage device, or volatile storage medium for storing or encoding data and programs. In some embodiments of the present invention, memory 112 and memory 122 represent the entire memory of computer server 110 and computer server 120, respectively, and may also include the memory of other computing devices (not shown) within distributed data processing environment 100 via network 140. Memory 112 and memory 122 are depicted as a single monolithic entity, but in other embodiments of the present invention, memory 112 and memory 122 are a more complex arrangement, such as a hierarchy of caches, or other memory types. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

Memory 112 is partitioned into main memory channel 114 and mirrored memory channel 116, in which mirrored memory channel 116 is a redundant copy of main memory channel 114. For example, the content of the mirrored memory partition, such as mirrored memory channel 116, is a copy of the content of the main memory partition, such as main memory channel 114. In some embodiments of the present invention, memory 112 is fully mirrored, such that main memory channel 114 and mirrored memory channel 116 include the full memory address range of memory 112 and are equivalent in size. In other embodiments of the present invention, main memory channel 114 and mirrored memory channel 116 may not be equivalent in capacity. It is noted that memory channel 114 and mirrored memory channel 116 are intended to be duplicates of each other for redundancy purposes. In some instances, a memory address of a memory channel, such as main memory channel 114, may be affected by a soft error at a particular memory address location. The soft error may create a change in the contents of one memory channel, such as main memory channel 114, causing it to be different at a particular memory address from the corresponding memory channel address, such as mirrored memory channel 116.

Similar to memory 112, memory 122 is partitioned into main memory channel 124 and mirrored memory channel 126, in which mirrored memory channel 126 is a redundant copy of main memory channel 124. In some embodiments of the present invention, memory 122 is fully mirrored, such that main memory channel 124 and mirrored memory channel 126 include the full memory address range of memory 122 and are equivalent in size. In other embodiments of the present invention, main memory channel 114 and mirrored memory channel 116 are equivalent in capacity.

Memory controller 130 reads and/or writes data in memory 112 via communication bus 118. It is noted that memory controller 130 may read and/or write data in memory 112 via alternative mediums not depicted in FIG. 1. Memory controller 132 reads and/or writes data in memory 122 via communication bus 128. It is noted that memory controller 132 may read and/or write data in memory 122 via alternative mediums not depicted in FIG. 1. Memory controller 130 and memory controller 132 may perform a plethora of functions during the operation of the computing process, including scrub operations. Memory controller 130 and memory controller 132 may initiate memory control operations based on instructions from computer server 110 and computer server 120, respectively, such as programs designed to perform memory control procedures, and/or user input. Memory controller 130 is depicted as including scrub controller program 300.

Scrub controller program 300 performs operations to improve efficiency and reduce power consumption during scrub operations on both main memory channel 114 and mirrored memory channel 116. In some embodiments of the present invention, scrub controller program 300 equally divides the address range of main memory channel 114 and mirrored memory channel 116. Dividing the address range of main memory channel 114 and mirrored memory channel 116 enables scrub controller program 300 to efficiently and effectively scrub a first half of main memory channel 114 and a second half of mirrored memory channel 116, reducing the time and energy consumption to complete scrubbing operations of effectively a full memory address range. In some embodiments of the present invention, scrub controller program 300, residing on computer server 110, performs scrub operations on memory external to computer server 110, such as main memory channel 124 and mirrored memory channel 126 of memory 122 residing on computer server 120. Scrub controller program 300 is programmed to perform scrubbing operations locally or remotely via network 140. The operation of scrub controller program 300 is described in further detail with respect to FIG. 3.

Figure 2:
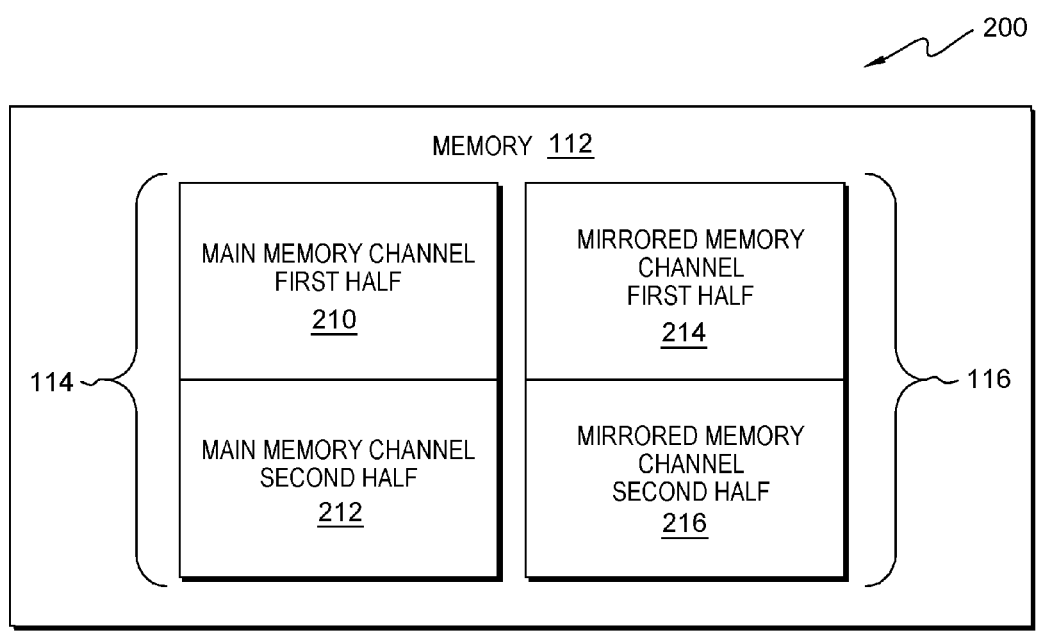
FIG. 2 is a block diagram illustrating mirrored memory channels of a computer server operating within the distributed data processing environment of FIG. 1, in accordance with an embodiment of the present invention.

FIG. 2 is a block diagram illustrating distributed data processing environment 200. Distributed data processing environment 200 illustrates memory 112 of computer server 110 within distributed data processing environment 100 of FIG. 1, in accordance with an embodiment of the present invention. In this example, main memory channel 114 (FIG. 1) is equally divided by scrub controller program 300 into main memory channel first half 210 and main memory channel second half 212. Similarly, mirrored memory channel 116 is equally divided by scrub controller program 300 into mirrored memory channel first half 214 and mirrored memory channel second half 216. If, for example, a scrubbing address range of a memory channel is represented as ranging from 0 to N, the address range of main memory channel first half 210 would consist of half the total address range of main memory, or 0 to N/2, of the total address range of main memory channel 114 from 0 to N. Main memory channel second half 212 would consist of the address range of main memory channel 114 from (N/2)+1 to N of the total address range of main memory channel 114 from 0 to N of a memory channel. In a similar manner, mirrored memory channel first half 214 would consist of a first half of the total address range of mirrored memory channel 116, or 0 to N/2, and mirrored memory channel second half 216 would consist of the second half of the total address range of mirrored memory channel 116, or (N/2)+1 to N. It should be noted that although equal division of memory channels may offer a more efficient scrubbing operation, some embodiments of the present invention achieve time and power consumption efficiencies from non-equal divisions of memory channels.

In this example, scrub controller program 300 scrubs main memory channel first half 210, and concurrently scrubs mirrored memory channel second half 216. Scrub rates of the two scrubs may vary, but both memory channel halves are scrubbed in one full scrub cycle. The process for scrubbing is then repeated at a predetermined or user-initiated frequency, for example, every 12 hours. In some embodiments, a full scrub cycle is one full scrubbing operation of two non-duplicate halves of mirrored memory address ranges. In that scenario, a full scrubbing operation of two non-duplicate memory halves is equivalent to a single pass of an entire memory address range of one memory channel, given that the main memory channel address range is a duplicate (with error exceptions) of the mirrored memory channel address range. In some embodiments of the present invention, scrub controller program 300 scrubs main memory channel second half 212 and concurrently scrubs mirrored memory channel first half 214. Scrub rates of the two scrubs may vary, but both memory channel halves are scrubbed in one full scrub cycle. The process for scrubbing is then repeated at a predetermined or user-initiated frequency, for example, every 12 hours.

In some embodiments of the present invention, scrub controller program 300 operates on an alternated scrub cycle. In a first scrub cycle, scrub controller program 300 scrubs main memory channel first half 210 and concurrently scrubs mirrored memory channel second half 216. Scrub rates of the two scrubs may vary, but both memory channels are scrubbed in one full scrub cycle. In a subsequent full scrub cycle, scrub controller program 300 alternates the portions of the main memory channel and the mirrored memory channel that are scrubbed. In the alternated full scrub cycle, scrub controller program 300 scrubs main memory channel second half 212, and concurrently, scrubs mirrored memory channel first half 214. Scrub rates of the second scrub cycle may vary, but both memory channel halves are scrubbed in one full scrub cycle. The process of alternating the memory address ranges of main memory channel 114 and mirrored memory channel 116, for scrubbing operations, is repeated at a predetermined or user-initiated frequency, for example, alternating memory channel halves that are scrubbed every 12 hours.

Figure 3:
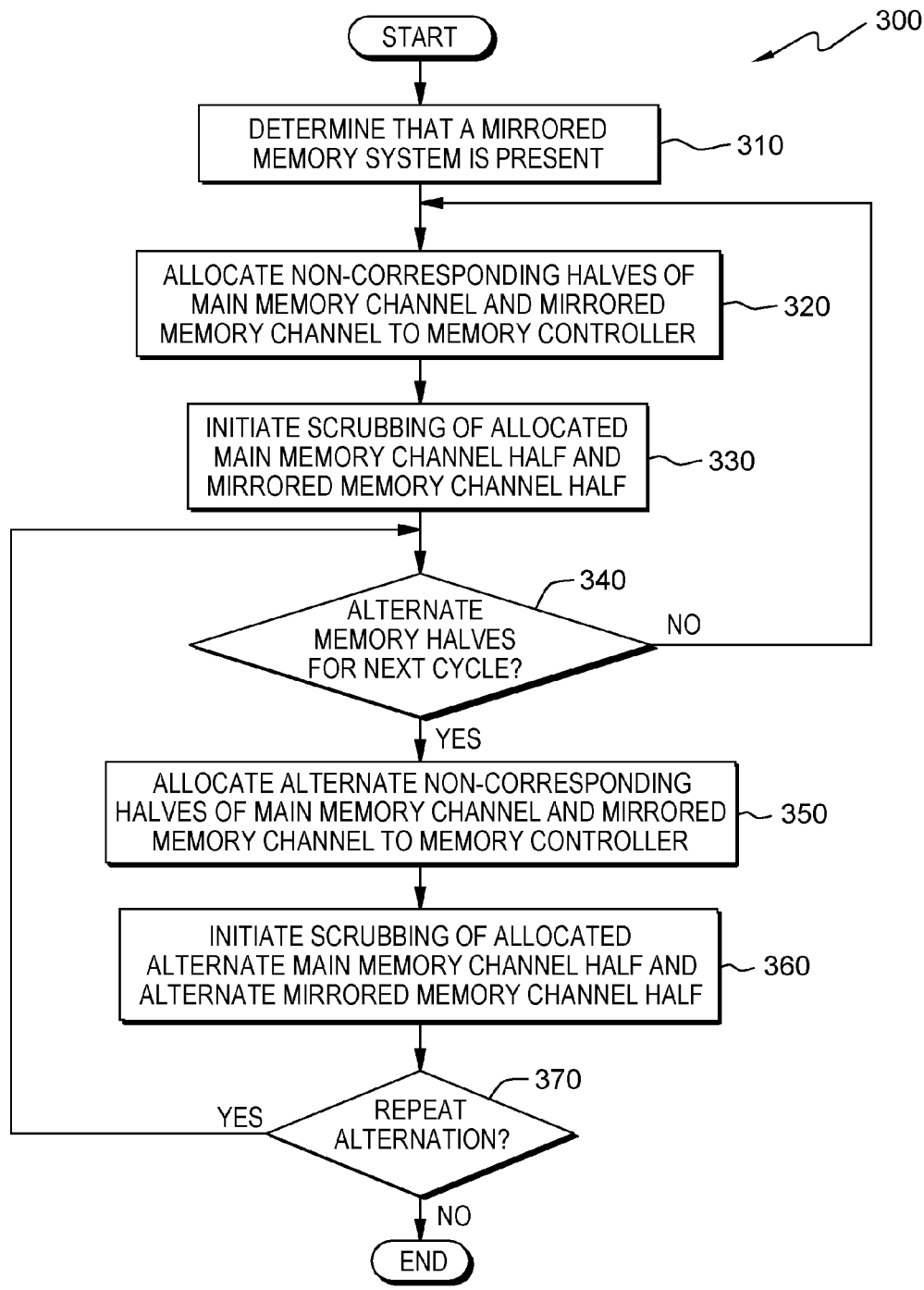
FIG. 3 illustrates operational steps of a scrub controller program, included within a memory controller of the computer server, within the distributed data processing environment of FIG. 1, in accordance with an embodiment of the present invention.

FIG. 3 illustrates operational steps of scrub controller program 300, included within memory controller 130 of computer server 110, within distributed data processing environment 100 of FIG. 1, in accordance with an embodiment of the present invention. Scrub controller program 300 determines if a mirrored memory system is present within memory 112 (step 310). In this example, scrub controller program 300 accesses the address ranges of memory 112 (FIG. 1) to determine if memory mirroring is configured. Scrub controller program 300 is applicable to a mirrored memory system, because duplication of memory channels enables a more efficient scrubbing operation to be performed.

For the case in which scrub controller program 300 determines that a mirrored memory system is present within memory 112 (step 310), scrub controller program 300 allocates non-corresponding halves of a main memory channel and a mirrored memory channel (step 320). Scrub controller program determines a split of the address range of both a main memory channel and mirrored memory channel into two portions. In some embodiments of the present invention, scrub controller program 300 splits the memory address range of both the main memory channel and the mirrored memory channel into equal portions. In other embodiments, the portions of split address ranges may not be equal; however, the combination of a portion of the main memory channel and a non-overlapping portion of the mirrored memory channel that are scrubbed, covers the equivalent of the entire memory address range of a memory channel of duplicate memory channels.

For example, scrub controller program 300 splits the address range of main memory channel 114 (FIG. 2) and mirrored memory channel 116 into two equal portions of the respective address ranges, resulting in main memory channel first half 210, main memory channel second half 212, mirrored memory channel first half 214, and mirrored memory channel second half 216. In some embodiments of the present invention, scrub controller program 300 allocates main memory channel first half 210 and mirrored memory channel second half 216 to a scrubbing operation of memory controller 130 (step 320). In other embodiments of the present invention, scrub controller program 300 allocates main memory channel second half 212 and mirrored memory channel first half 214 to the scrubbing operation of memory controller 130.

Subsequent to allocating the appropriate portions of address ranges of the main memory channel and the mirrored memory channel to the scrubbing operation of memory controller 130, scrubbing controller program 300 initiates scrubbing operations of the allocated address ranges (step 330). Scrubbing operations proceed in which memory controller 130 determines and corrects errors using ECC by monitoring bit data read from memory 112, identifying bit errors, and replacing bit errors with corrected bit data in the appropriate location within the memory address range.

Having completed a scrubbing cycle of half of the main memory channel address range and half of mirrored memory channel address range, scrub controller program 300 determines whether the memory channel halves to be scrubbed are to be alternated in a next scrubbing cycle (decision step 340). In this example, scrub controller program determines to scrub the same halves of the main memory channel address range and the mirrored memory channel address range in subsequent scrubbing cycles, (step 340, "NO" branch), and scrub controller program 300 returns to step 320 for the next subsequent scrubbing cycle and proceeds as described above. That is, scrub controller program 300 determines to not alternate memory channel halves after scrubbing main memory channel first half 210 (FIG. 2) and mirrored memory channel second half 216. In the next scrubbing cycle, scrub controller program 300 again scrubs main memory channel first half 210 and mirrored memory channel second half 216 as described above beginning with step 320.

In some embodiments of the present invention where scrub controller program 300 operates on an alternated full scrub cycle, scrub controller program 300 determines to alternate between the halves of the main memory channel address range and the mirrored memory channel address range in the next scrubbing cycle (step 340, "YES" branch). In the next scrubbing cycle, scrub controller program 300 allocates alternate non-corresponding halves of the main memory channel and the mirrored memory channel to the memory controller to perform the next memory scrub operation (step 350). Scrub controller program 300 scrubs the halves of the memory channel address ranges that were not scrubbed in the previous scrubbing cycle by allocating the alternate main memory channel half and alternate mirrored memory channel half to a scrubbing operation of memory controller 130. For example, scrub controller program 300 determines to alternate memory channel halves after scrubbing main memory channel first half 210 (FIG. 2) and mirrored memory channel second half 216 in the first scrubbing cycle. In the second scrubbing cycle, scrub controller program 300 allocates main memory channel second half 212 and mirrored memory channel first half 214 for the scrubbing operation (step 350).

Subsequent to allocating the appropriate memory address ranges of main memory channel second half 212 and mirrored memory channel first half 214 to the scrubbing operation of memory controller 130, scrub controller program 300 initiates scrubbing operations of the allocated address ranges (step 360). Scrubbing operations proceed in which memory controller 130 determines and corrects errors using ECC by monitoring bit data read from memory 112, identifying bit errors, and replacing bit errors with corrected bit data in the appropriate location within the address range.

In response to completion of the current instance of a full scrubbing cycle, the current instance of scrubbing of main memory channel second half 212 and mirrored memory channel first half 214 terminates, scrub controller program 300 determines whether to repeat an alternation of memory channel halves for the next cycle (decision step 370). In this example, scrub controller program determines to alternate memory channel halves for the next cycle, (step 370, "YES" branch), and scrub controller program 300 returns to decision step 340 and determines whether to alternate between the halves of the main memory channel and mirrored memory channel for the next subsequent scrubbing cycle, and proceeds as described above.

In some embodiments of the present invention, scrub controller program 300 determines to not alternate the halves of the main memory channel address range and the mirrored memory channel address range for the next scrubbing cycle and scrub controller program 300 ends (step 370, "NO" branch). In the next scrubbing cycle, scrub controller program 300 allocates the non-corresponding halves of the main memory channel and the mirrored memory channel to the memory controller to perform the next memory scrub operation when the program begins again.

Figure 4:
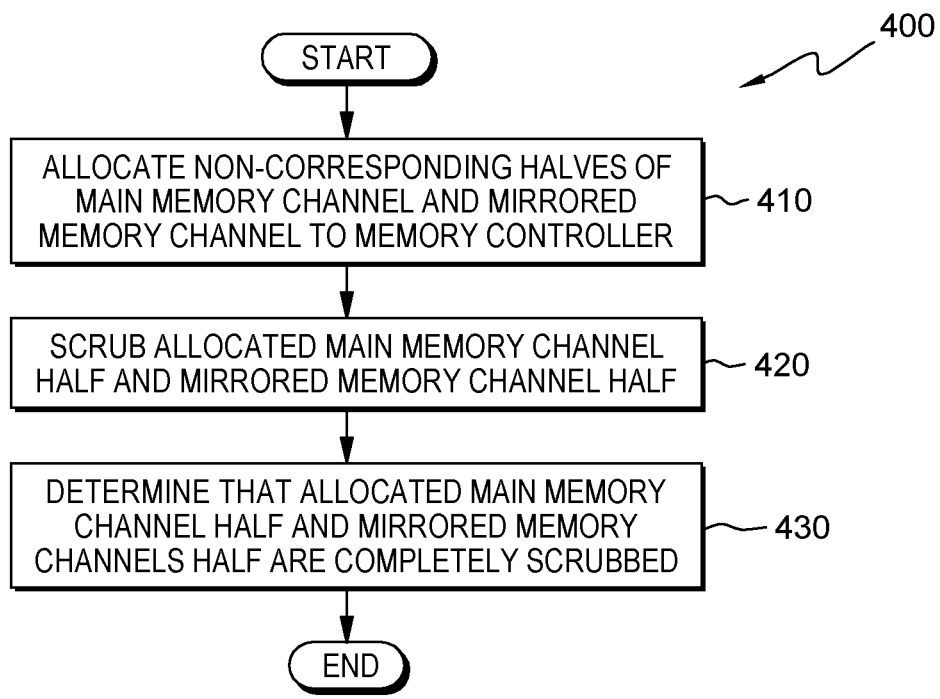
FIG. 4 illustrates additional operational steps of the scrub controller program, included within the memory controller of the computer server, within the distributed data processing environment of FIG. 1, in accordance with an embodiment of the present invention.

FIG. 4 illustrates flowchart 400 which shows additional operational steps of scrub controller program 300, included within memory controller 130 of computer server 110, within distributed data processing environment 100 of FIG. 1, in accordance with an embodiment of the present invention. Scrub controller program 300 allocates non-corresponding halves of a main memory channel and a mirrored memory channel (step 410) as described in FIG. 3.

Subsequent to allocating the appropriate portions of address ranges of the main memory channel and the mirrored memory channel to the scrubbing operation of memory controller 130, scrubbing controller program 300 initiates scrubbing operations of the allocated address ranges (step 420) as also described in FIG. 3.

Having completed a scrubbing cycle of half of the main memory channel address range and half of mirrored memory channel address range, scrub controller program 300 determines whether the allocated memory address ranges are completely scrubbed (step 430). In this example, scrub controller program 300 does not proceed until all allocated memory address ranges are scrubbed in one scrub cycle. Scrub controller program 300 waits until the allocated memory address ranges are scrubbed before proceeding.

Figure 5:
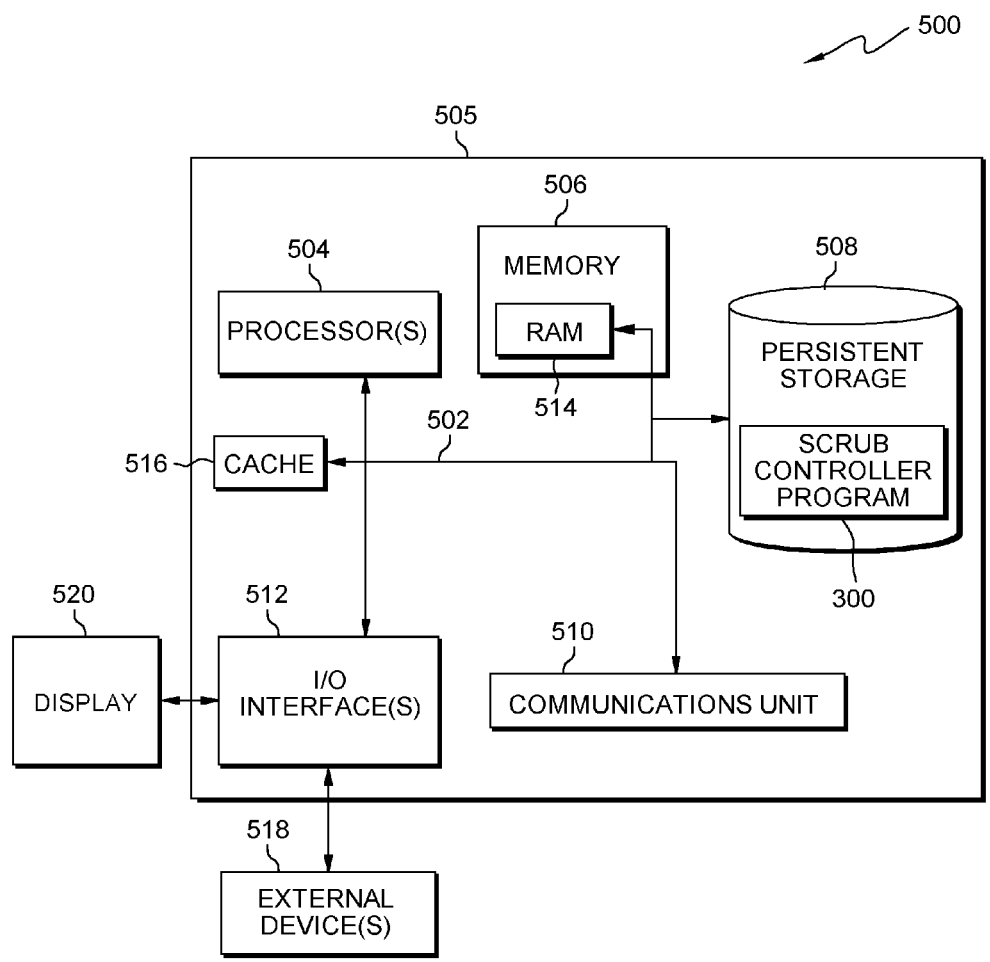
FIG. 5 depicts a block diagram of components of a computing system, which includes a computing device capable of operating the scrub controller program of FIG. 3, in accordance with an embodiment of the present invention.

FIG. 5 depicts a block diagram of components of computing system 500, which includes computing device 505, which is capable of operating scrub controller program 300 of FIG. 3, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 505, includes components and functional capability similar to computer server 110 and computer server 120, in accordance with an illustrative embodiment of the present invention. Computing device 505 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506, cache memory 516, and persistent storage 508 are computer readable storage media. In this embodiment, memory 506 includes random access memory (RAM) 514. In general, memory 506 can include any suitable volatile or non-volatile computer readable storage media.

In some embodiments of the present invention, scrub controller program 300 is stored in persistent storage 508 for execution by one or more of the respective computer processor(s) 504 via one or more memories of memory 506. In these embodiments, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of distributed data processing environment 100 and computer servers 110 and 120. In these examples, communications unit 510 includes one or more network interface cards. Communications unit 510 may provide communications through the use of either or both physical and wireless communications links. Scrub controller program 300 may be downloaded to persistent storage 508 through communications unit 510.

I/O interface(s) 512 allows for input and output of data with other devices that may be connected to computing system 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., scrub controller program 300 can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of scrubbing a computer memory of a local computing device in a mirrored memory system, the computer-implemented method comprising:

allocating a main memory partition of a mirrored memory system and a mirrored memory partition of the mirrored memory system for scrubbing, the mirrored memory partition being a mirrored copy of the main memory partition, dividing the main memory partition into two portions, the two portions being a first main memory portion and a second main memory portion;

dividing the mirrored memory partition into two portions, the two portions being a first mirrored memory portion and a second mirrored memory portion;

establishing a full scrub cycle that only scrubs one portion of the main memory partition and one portion of the mirrored memory partition, the full scrub cycle including scrubbing a main memory scrub portion and a mirrored memory scrub portion;

identifying the main memory scrub portion as the first main memory portion and the mirrored memory scrub portion as the second mirrored memory portion for the full scrub cycle, the main memory scrub portion being one half of the main memory partition and the mirrored memory scrub portion being one half of the mirrored memory partition, wherein content of the main memory scrub portion and content of the mirrored memory scrub portion are distinct and are equivalent to a memory address range of the main memory partition;

initiating the full scrub cycle at a first time;

responsive to reaching a predetermined time after the first time, establishing a consecutive scrub cycle that only scrubs an alternate main memory scrub portion and an alternate mirrored memory scrub portion, wherein the alternate main memory scrub portion is the second main memory portion and the alternate mirrored memory scrub portion is the first mirrored memory portion;

initiating the consecutive scrub cycle;

wherein:

allocating the main memory partition and the mirrored memory partition is performed on a network connected to a remote computing device;

the main memory scrub portion and the mirrored memory scrub portion include non-consecutive portions of respective memory partitions;

the local computing device includes a redundant array of independent disks (RAID); and the computer memory utilizes the mirrored memory system including the main memory partition and the mirrored memory partition that in combination defines the memory address range of the local computing device.

* * * * *